Patented Oct. 12, 1948

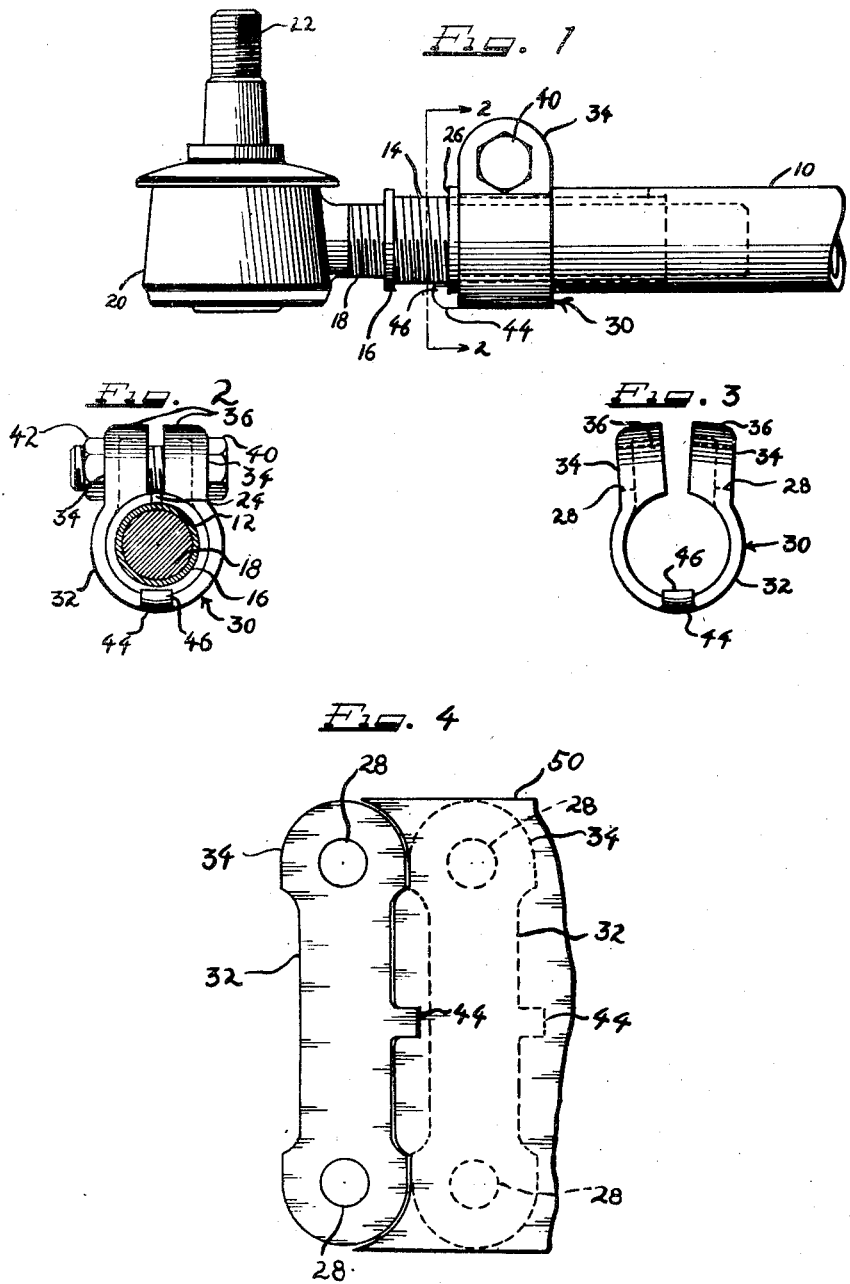

2,451,062

UNITED STATES PATENT OFFICE 2,451,062

CLAMP ASSEMBLY

James H. Booth, Detroit, Mich., assignor to Thompson Products, Inc., Cleveland, Ohio, a corporation of Ohio Application December 21, 1945, Serial No. 636,379

3 Claims. (Cl. 287—90)

This invention relates to connection members adapted to receive inserts therein and having non-integral ring-like clamps associated therewith for tightening the connecting member around an insert.

More specifically, this invention relates to link rods, such as tie rods or the like, which are provided with hollow slotted end portions adapted to receive an insert therein and are contracted and tightened about such insert by a non-integral ring-like clamping member.

The invention particularly relates to the provision of means on the ring-like clamping member for longitudinally positioning such clamping member relative to the tie rods.

While the invention will be hereinafter specifically described in connection with tie rods, it should be understood that the principles of the invention are not limited to such use and that the product of the invention relates to connection members in general.

Tie rods have heretofore been known which comprise a hollow tube-like member generally prepared from seamless or butt-welded tubing. The connecting end of such rods has been internally threaded and longitudinally slotted to receive a threaded insert. Separate clamping rings have heretofore been utilized comprising split annular members, the split ends of which are drawn together by a suitable clamping member such as a bolt. However, in the constructions heretofore utilized such clamping rings were devoid of any means for positioning the rings properly with respect to the connection members. Clamping rings of the type that have heretofore been utilized would readily slip longitudinally along the connecting member, particularly upon the application of a wrench to the clamping bolt and accordingly, when assembled by inexperienced mechanics, the clamping ring would be disposed a substantial longitudinal distance away from the end of the slotted portion of the connecting member. Hence, the maximum contraction of the connecting member was not obtained.

The present invention now provides clamping rings of a novel construction in that positioning lips are integrally formed on such clamping rings which cooperate with the end face of the slotted portion of the connecting member to longitudinally locate such clamping ring in a position of maximum effectiveness.

In accordance with the present invention, the clamping rings may be stamped from sheet metal or may be forged from suitable blanks, and their construction is such that the additional means for longitudinally locating the clamping rings can be formed without increasing the size of the blank which is required for producing clamping rings without the desirable feature of this invention. A clamping ring in accordance with this invention comprises a split annular body portion which can be slipped over the connecting member and has integrally formed, opposed, generally radially disposed end tabs through which is passed the clamping bolt which draws the split body portion together to produce the clamping action. To reinforce the end tabs, each is provided with integrally formed, inturned flanges about the periphery of the end tab which are disposed generally parallel to the axis of the clamping bolt. It is, therefore, apparent that the developed width of the end tab portions of the clamping rings, or the width of the blank required for forming such end tabs by stamping, is substantially greater than the width of the blank required for the annular body portion. It is a feature of this invention that this difference in width of the developed annular body portion and the developed end tab portions is utilized for the formation of a locating tab or lip. Such lip, in its completed form, projects from the annular body portion in a generally axially parallel direction and has the end thereof inturned radially to form a hook which cooperates with the end of the slotted portion of the connecting member to secure the clamping ring in fixed longitudinal relationship thereto. It is therefore apparent that this desirable locating member is provided without requiring any increase in the width of the sheet metal blank from which the clamping member is stamped.

It is therefore an object of this invention to provide an improved connection member and clamping ring therefor characterized by the provision of means for longitudinally positioning the clamping ring on the connecting member in its most effective position relative to the connecting member.

A particular object of this invention is to provide a clamping ring for a hollow contractible connecting member having a projecting lip formed thereon which is engageable with the end of the connecting member to longitudinally position the clamping member in its most effective position on the connecting member.

A specific object of this invention is to provide a novel and improved structure for a clamping ring including an integrally formed lip member for positioning the clamping ring on a cylindrical member insertible through such ring and characterized by the fact that the width of the sheet metal blank from which the improved clamping ring is formed is not increased over that required for forming clamping rings of conventional construction.

Other and further objects of the invention become apparent to those skilled in the art from the following detailed description of the annexed sheet of drawing, which discloses a preferred embodiment of the invention.

On the drawing:

Figure 1 is a side elevational view of a tie rod according to this invention shown in assembled relationship with a tie rod joint and including a clamping member constructed in accordance with this invention.

Figure 2 is a transverse sectional view of Figure 1 taken on the plane II—II thereof.

Figure 3 is a front elevational view of a clamping member constructed in accordance with this invention.

Figure 4 is a plan view showing a strip of metal from which the clamping member in accordance with this invention may be stamped; showing the developed outline of the clamping member blank in full lines as it is cut away from the sheet metal strip and in dotted lines to indicate the position of the next blank to be cut from the strip.

As shown on the drawing:

The reference numeral 10 in Figure 1 designates a tie rod according to this invention. The tie rod 10 comprises a tubular member having at least one hollow open end 12 which is internally threaded for a desired distance into the rod for receiving the externally threaded shank 14 of a hollow adapter member 16, which in turn is internally threaded to receive the externally threaded shank or stem 18 of a tie rod joint housing 20. The joint housing 20 has a stud 22 projecting therefrom which is rotatable and tiltable in the housing 20.

A longitudinally extending slot 24 is provided in the tie rod 10 running inwardly from open end 12 thereof.

To contract the slotted end 12 of the tie rod 10 on the threads of the member 16 inserted therein, a clamping member or ring 30 is provided having an annular body portion 32 which freely surrounds the periphery of tie rod 10 in the unstressed condition of clamping ring 30. On each end of the split annular portion 32 of the clamping ring 30, a generally radially projecting clamping tab 34 is integrally formed. The clamping tabs 34 are disposed in opposed relationship and have suitable transverse holes 28 therethrough to accommodate a clamping bolt 40. The clamping tabs 34 are drawn together, and hence the annular body portion 32 of the clamping ring 30 contracted, by tightening of a nut 42 on bolt 40.

To stiffen the clamping tabs 34 against the forces exerted by clamping bolt 40, each of the tabs is provided around its periphery with an inwardly turned flange portion 36. It is therefore apparent, as clearly indicated in Figure 4, that in blank form, the developed width of the clamping tab portions 34 is substantially greater than the developed width of the annular body portion 32 of clamping ring 30.

A lip member 44 is integrally formed on the annular body portion 32, projecting outwardly from such body portion in an axially parallel direction and terminating in an inwardly bent hook portion 46. When the clamping ring 30 is assembled on the tie rod 10, the hook portion 46 of the lip 44 engages the end face of the split end portion 12 of the tie rod 10 to locate the clamping ring in a fixed longitudinal position relative to the tie rod, and, in particular, to locate the clamping ring at the extreme end of the slotted end portion of the tie rod 10 at which point the clamping ring will exert the greatest contractive force on the tie rod.

As is clearly shown in Figure 4, the combined developed width of the annular body portion 32 of the clamping ring 30 and the lip 44 is proportioned so as to be not greater than the developed width of the tab portions 34 of the clamping ring 30. With this construction the clamping rings may be stamped from a sheet 50 of suitable metal with the lip 44 integrally formed thereon without increasing the amount of sheet metal stock required to produce the clamping rings 30 without the lip portion, inasmuch as the lip portion is cut from a piece of metal normally lying between adjacent stampings.

It is therefore apparent that the aforedescribed construction of the tie rod and its associated clamping ring provides a connector arrangement wherein the clamping ring is definitely positioned relative to the connecting member in its position of maximum effectiveness. Furthermore, the improved construction may be obtained by stamping operations without an increase in the amount of sheet metal stock required to produce the conventional clamping rings.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. In combination, a link rod having a hollow slotted end portion adapted to be contracted around an insert, a clamp member having a split annular body portion surrounding said slotted end portion, means for drawing together said split annular body portion around said link rod, thereby contracting said slotted end portions, and a projecting lip member integrally formed on said clamp member and engageable with said link rod to longitudinally position said clamp member on said link rod.

2. In combination, a link rod having a hollow slotted end portion adapted to be contracted around an insert, a clamp member having a split annular body portion surrounding said slotted end portion, means for drawing together said split annular body portion around said link rod, thereby contracting said slotted end portions, a lip member integrally formed on said annular body portion of said clamp member and projecting therefrom in an axially parallel direction, and a hooked end portion on said lip member engageable with the end face of said slotted end portion of said link rod to longitudinally position said clamp member on the hollow end portion of said link rod.

3. For use on a link rod having a contractible hollow end portion, a clamp member comprising a split annular body portion formed from sheet metal and having integral, opposed, generally radially disposed end tabs, said annular body portion being adapted to surround the hollow end portion of the link rod, said end tabs each having integrally formed, inturned flanges, whereby said end tabs require a larger preforming developed width than the annular body portion, and an axially parallel projecting integrally formed lip member on said annular body portion, said lip member having a radially inturned hooked end adapted to engage the end face of the link rod, the combined developed blank width of said annular body portion and said lip member being not greater than the developed blank width of said end tabs.

JAMES H. BOOTH.

REFERENCES CITED

The following references are of record in the file of this patent:

UNITED STATES PATENTS

| Number | Name | Date |
|---|---|---|
| 1,392,810 | Zifferer | Oct. 4, 1921 |
| 1,531,017 | Miller | Mar. 24, 1925 |
| 1,883,748 | Baker | Oct. 18, 1932 |
| 2,227,648 | Hofferd | Jan. 7, 1941 |